(12) United States Patent
Schneider et al.

(10) Patent No.: US 9,804,982 B2
(45) Date of Patent: Oct. 31, 2017

(54) INTERFACE MODULE

(71) Applicant: CONTINENTAL AUTOMOTIVE GMBH, Hannover (DE)

(72) Inventors: Klaus-Dieter Schneider, Lappersdorf (DE); Bernhard Hauck, Seubersdorf (DE)

(73) Assignee: Continental Automotive GmbH, Hannover (DE)

( * ) Notice: Subject to any disclaimer, the term of this patent is extended or adjusted under 35 U.S.C. 154(b) by 128 days.

(21) Appl. No.: 14/978,046

(22) Filed: Dec. 22, 2015

(65) Prior Publication Data

US 2016/0179724 A1 Jun. 23, 2016

(30) Foreign Application Priority Data

Dec. 22, 2014 (DE) .................. 10 2014 226 868
Jan. 20, 2015 (DE) .................. 10 2015 200 858

(51) Int. Cl.
  *G06F 13/42* (2006.01)
  *G06F 13/372* (2006.01)
  *G06F 13/00* (2006.01)
  *G06F 13/40* (2006.01)
  *H04J 13/16* (2011.01)
  *H04J 13/10* (2011.01)
  *H04J 13/00* (2011.01)
  *G06F 3/00* (2006.01)

(52) U.S. Cl.
  CPC ............ *G06F 13/372* (2013.01); *G06F 13/00* (2013.01); *G06F 13/4068* (2013.01); *G06F 13/4282* (2013.01); *G06F 3/00* (2013.01); *H04J 13/10* (2013.01); *H04J 13/16* (2013.01); *H04J 2013/0037* (2013.01)

(58) Field of Classification Search
  CPC .. G06F 13/4068; G06F 13/00; G06F 13/4282; G06F 3/00; H04J 2013/0037; H04J 13/10; H04J 13/16
  See application file for complete search history.

(56) References Cited

U.S. PATENT DOCUMENTS 7,446,430 B2    11/2008  Leung et al.
2015/0356027 A1*  12/2015  Arbel .................... G06F 12/145
                                                         710/308

FOREIGN PATENT DOCUMENTS

DE  102008035085 A1  2/2010
DE  102010061734 A1  5/2012
DE  102011004358 B3  5/2012
DE  102013210093 A1  12/2014

* cited by examiner

*Primary Examiner* — Ernest Unelus
(74) *Attorney, Agent, or Firm* — Laurence A. Greenberg; Werner H. Stemer; Ralph E. Locher

(57) ABSTRACT

An interface module has at least a configuration connection, a reset connection, a transmission connection and a reception connection. The interface module also has at least a first interface processing unit and a second interface processing unit which differs from the first interface processing unit and the connections of which can be connected to the connections of the interface module via a multiplexer. Only one set of interface connections needs to be provided on the interface module. The multiplexer is controlled by a level at the

7 Claims, 4 Drawing Sheets

INTERFACE MODULE

CROSS-REFERENCE TO RELATED APPLICATION

This application claims the priority, under 35 U.S.C. §119, of German patent applications Nos. DE 10 2014 226 868.0, filed Dec. 22, 2014, and DE 10 2015 200 858.4, filed Jan. 20, 2015; the prior applications are herewith incorporated by reference in their entirety.

BACKGROUND OF THE INVENTION

Field of the Invention

In many technical fields, in particular in motor vehicle electronics, actuators, for example fuel injection valves, are controlled by control devices, the core of which is formed by a microprocessor, on the basis of sensor signals to be processed. The microprocessor is usually connected to the sensors and actuators using special buses, in particular serial buses, for example the PSI5 bus (Peripheral Sensor Interface 5), in order to save lines.

Due to the fact, however, that only a limited number of output connections are available for such peripheral components in microprocessors and the output connections should be designed as universally as possible for a multiplicity of different peripheral components, interface modules are used to transmit the signals provided by the microprocessor and to be transmitted to the sensors or to be received from the latter via a first interface preferably used by the microprocessor and with sensors, for example, via a second interface particularly suitable for the latter.

The SPI (Serial Peripheral Interface) bus, the $I^2C$ (Inter-Integrated Circuit) or the microsecond bus or a UART (Universal Asynchronous Receiver/Transmitter) interface, for example, can be considered as first interfaces, whereas the PSI5 bus, for example, is preferred for transmitting sensor data and for controlling sensors.

In this case, such an interface module may have a multiplicity of second interfaces, the signals coming from the microprocessor or to be transmitted to the latter being distributed, by a control device in the interface module, to the interfaces which are intended to be connected to the microprocessor.

However, it is possible for different microprocessors to each have a different interface for communicating with peripheral modules or for only one particular interface of a plurality of existing interfaces to be available for a given application.

This means that an interface module should be equipped with all common interfaces for connection to a microprocessor. However, this results in an undesirably large number of connection pins on the interface module, as shown using the example in FIG. 1.

FIG. 1 schematically shows a module having a first supply voltage connection for a high potential Vdd and a second supply voltage connection for a low potential Gnd of a supply voltage. It also has a selection connection $\overline{CS}$ conventional for such peripheral modules and a reset connection $\overline{RST}$. In the illustrated example, the module is intended to make it possible to transmit signals from and to a microprocessor both via an SPI bus and via a UART interface. For this purpose, both the corresponding processing devices of the SPI interface and the UART interface are provided internally and the connection pins required for them are provided on the housing.

At least three connections are required for an SPI interface, namely a clock connection CLK, a connection for transmitting data from the master to the slave MTSR (master transmit slave receive) and a connection for transmitting data from the slave to the master MRST (master receive slave transmit). The microprocessor is the master and the interface module is the slave in that case.

Only two connections for reception RxD and for transmission TxD are required for a UART interface.

Furthermore, it is now necessary to provide a configuration connection CFG which can be used to select which interface is intended to be used for the respective application, which is carried out, in the example illustrated, by an internal active-low connection, in which case a presetting is carried out by virtue of the two interface processing devices having activation connections $\overline{En}$, one of which is connected to the high supply voltage potential Vdd directly via a resistor, and the other of which is connected to this high supply voltage potential Vdd via an inverter, with the result that the interface processing device connected via the inverter is the selected one since the selection connection $\overline{En}$ is at low potential even if no potential is applied to the configuration connection CFG. If a low potential is applied to the configuration connection CFG, the other processing device is accordingly selected.

If yet further interface processing devices have to be provided in the interface module, for example an $I^2C$ interface processing device and a microsecond interface processing device, corresponding connection pins must be available. A correspondingly higher number of configuration pins would also be necessary in order to be able to select a corresponding interface processing device.

SUMMARY OF THE INVENTION

It is accordingly an object of the invention to provide an interface module which overcomes the above-mentioned and other disadvantages of the heretofore-known devices and methods of this general type and to specify an improved interface module which manages with a smaller number of connection pins.

With the foregoing and other objects in view there is provided, in accordance with the invention, an interface module, comprising:

a configuration connection, a reset connection, a transmission connection, and a reception connection;

a plurality of interface processing units, including a first interface processing unit and a second interface processing unit different from the first interface processing unit, the interface processing units having a first and a second activation connection, a first and a second transmission connection, and a first and a second reception connection;

a multiplexer having:
a transmission input and a reception input connected to the transmission connection and to the reception connection of the plurality of connections;
a first and a second transmission output and a first and a second reception output, and a control input;
the first transmission output and the first reception output of the multiplexer being connected to the first transmission connection and to the first reception connection of the first interface processing unit; and
the second transmission output and the second reception output of the multiplexer being connected to the second transmission connection and to the second reception connection of the second interface processing unit;

an evaluation circuit having an input connection connected to the configuration connection of the plurality of connections and configured to convert a level of a signal at the input connection into a binary code and to make the signal available at an output connection connected to the control input of the multiplexer;

a selection circuit having a control connection connected to the output connection of the evaluation circuit and having a first and a second signal output connected to the first activation connection of the first interface processing unit and to the second activation connection of the second interface processing unit.

In other words, an interface module according to the invention is accordingly equipped with at least a configuration connection, a reset connection, a transmission connection and a reception connection. It has at least a first interface processing unit and a second interface processing unit which differs from the first interface processing unit, said interface processing units having at least a first and a second activation connection, a first and a second transmission connection and a first and a second reception connection. It also has a multiplexer with a transmission input and a reception input, which are connected to the transmission connection and to the reception connection of the interface module, and with at least a first and a second transmission output and at least a first and a second reception output, and with at least one control input, the first transmission output and the first reception output of the multiplexer being connected to the first transmission connection and to the first reception connection of the first interface processing unit, and the second transmission output and the second reception output of the multiplexer being connected to the second transmission connection and to the second reception connection of the second interface processing unit. It also has an evaluation circuit, the input connection of which is connected to the configuration connection of the interface module, and which is set up to convert a level of a signal at the input connection into a binary code and to make it available at at least one output connection which is connected to the at least one control input of the multiplexer. Provision is also made of a selection circuit with at least one control connection and at least a first and a second signal output, the at least one control connection of which is connected to the at least one output connection of the evaluation circuit and the at least first and second signal outputs of which are connected to the first activation connection of the first interface processing unit and to the second activation connection of the second interface processing unit.

On account of the use according to the invention of a multiplexer inside the interface module, it is possible to provide an arbitrary number of interface processing units inside the module, which interface processing units can be connected to only one set of external connection pins via the multiplexer, the number of connection pins to be provided corresponding to the number of connection pins required for the interface processing unit having the most connections. In a known manner, one of the interface processing units may be connected to the connection pins of the interface module in a preset manner, in which case it is possible to select another interface processing unit by means of a signal or signals at one or more configuration connections.

If the configuration signals can assume only two states, a corresponding number of configuration pins need to be provided for a given number of interface processing units. However, it is also possible for the configuration signal to be able to assume a plurality of different levels, with the result that only one configuration connection is required, but a corresponding processing unit, for example an analog/digital converter which evaluates the level of the configuration signal, needs to be internally provided.

In one advantageous development of the interface module, its evaluation circuit has a memory unit for storing the binary code representing the selection. In this case, the memory may be a volatile memory, with the result that the selection is retained only for the time during which a supply voltage is applied to the interface module. However, it is also possible to provide a read-only memory in order to retain the selection even for the situation in which the supply voltage is removed from the interface module.

In one advantageous embodiment of the interface module according to the invention, the module selection connection forms the configuration connection, the evaluation circuit being connected to the reset connection and having an A/D converter which is used to convert a level of a signal at the configuration connection into a binary code using that edge of the signal at the reset connection which concludes the reset operation.

This advantageously makes it possible to save a special configuration connection by virtue of the signals being logically combined at two module connections which are present anyway. A low level at the reset input is usually used to carry out a reset operation in the module and a falling edge from a high level to a low level is used to initiate the reset operation. Accordingly, the reset operation is concluded with a rising edge. With this rising edge, the level at the module selection connection is then transferred to the evaluation circuit for A/D conversion. In principle, however, the respective other levels or edges can also be used.

If only two interface processing units are provided, the evaluation circuit and the selection circuit can be implemented by means of a D-type flip-flop, in which case the configuration connection can also be advantageously saved here by virtue of the level at the module selection connection being evaluated and stored for selection using that edge of the signal at the reset connection which concludes the reset operation.

In a first variant of an interface module having such a D-type flip-flop, the multiplexer may have a further output for each interface processing unit, each of which outputs is connected to the activation connection of an associated interface processing unit, whereas the multiplexer has a further input which is connected to the low supply voltage potential, with the result that, by virtue of the output signal from the D-type flip-flop, one of the activation connections is connected to this low supply voltage potential and the corresponding interface processing unit is therefore selected or activated. In a known manner, the activation connections can be connected to the high supply voltage potential via a resistor in order to ensure that only one interface processing unit can be activated.

Alternatively, it is also possible to connect the output of the D-type flip-flop to the activation connections of the interface processing units directly, one of the activation connections respectively being connected to the output connection of the D-type flip-flop directly and the other being connected to the output connection of the D-type flip-flop via an inverter, with the result that it is also ensured here that only one of the interface processing units is ever activated, in which case it is possible to stipulate, by selecting the interface unit whose activation connection is connected to the output of the D-type flip-flop via the inverter, which interface processing unit is selected by means of presetting.

Other features which are considered as characteristic for the invention are set forth in the appended claims.

Although the invention is illustrated and described herein as embodied in an interface module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
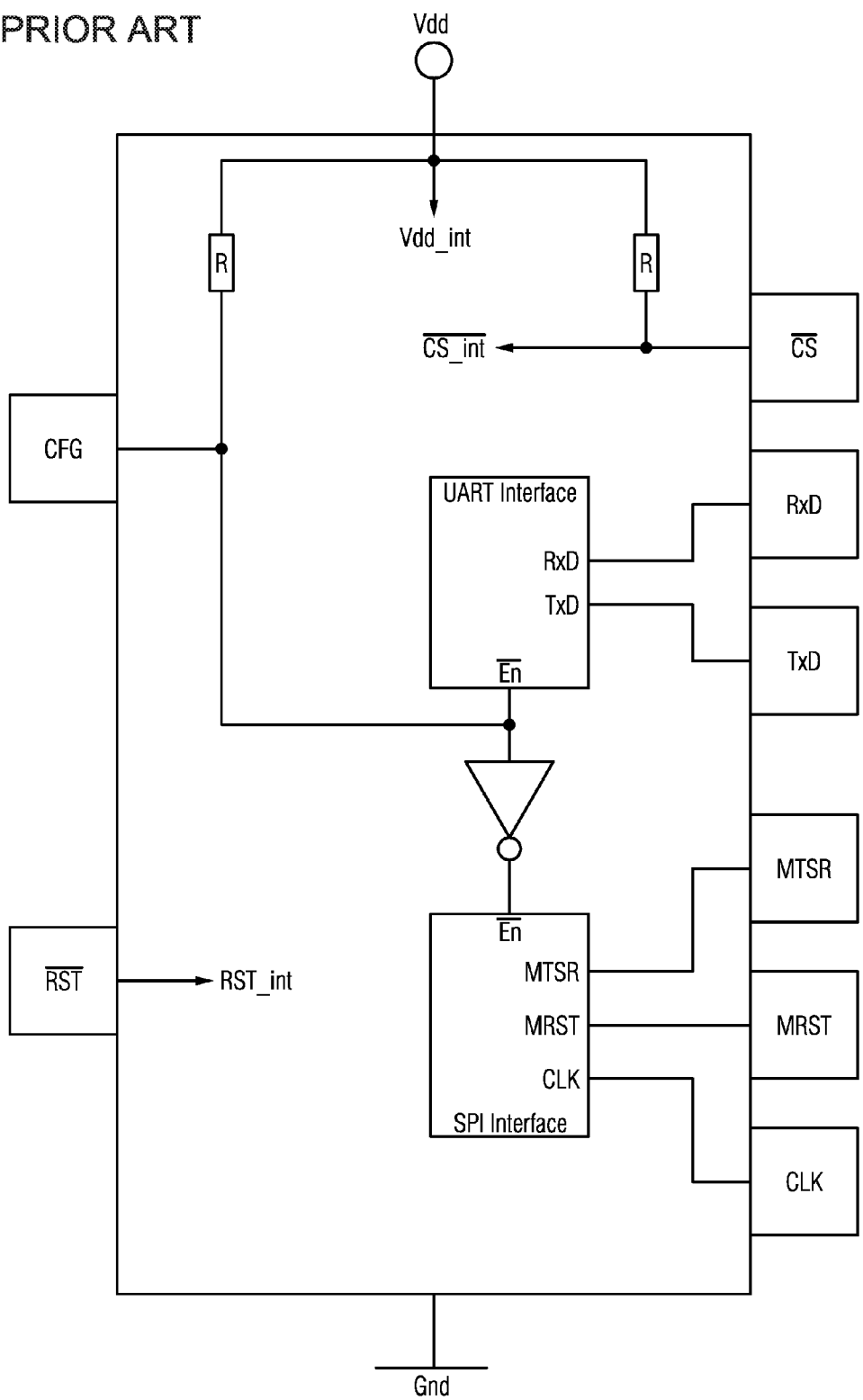
FIG. 1 is a schematic diagram of an interface module according to the prior art.
Figure 2:
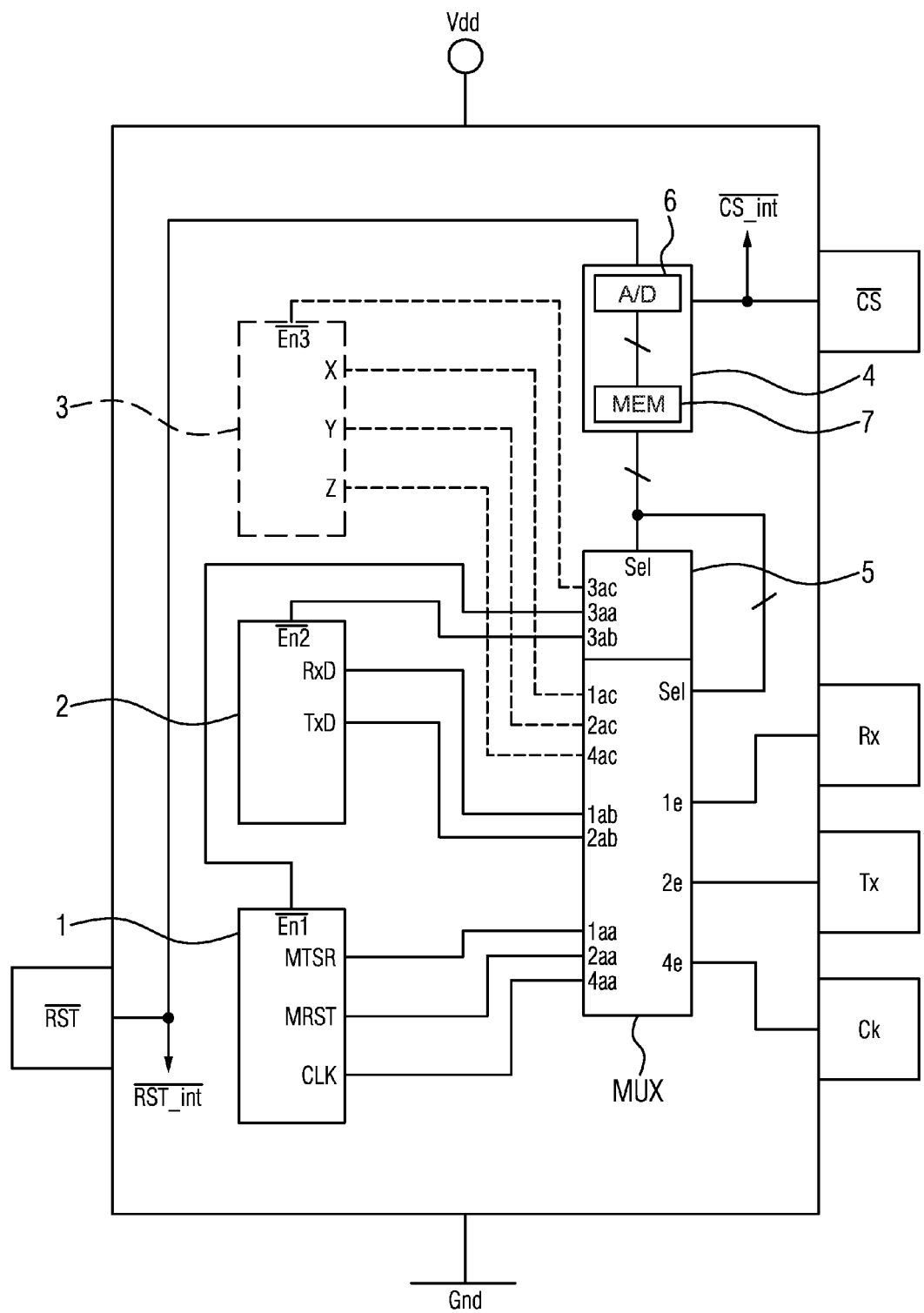
FIG. 2 is a schematic diagram of an interface module according to the invention.

Referring now to the figures of the drawing in detail and first, particularly, to FIG. 2 thereof, there is shown an interface module according to the invention which is supplied using a high supply voltage potential Vdd and a low supply voltage potential Gnd. As the interface module, it has the task of transmitting signals, which are transmitted from and to a microprocessor via a first bus, to one connection of a multiplicity of connections to which sensors or actuators can be connected in order to be able to be transmitted there via suitable buses.

For reasons of clarity, the interfaces to the sensors and actuators which can possibly be connected are not illustrated and the processing unit which converts the interface protocols and/or signal levels is also not illustrated in any more detail since it is familiar to a person skilled in the art.

In order to communicate with a microprocessor, the interface module has a reception connection Rx, a transmission connection Tx and a clock signal input Ck. These connections are designed in such a manner that it is possible to connect to all conventional buses, for example the SPI bus, the I²C bus and the microsecond bus or a UART interface.

In its interior, the interface module has a number of interface processing devices 1, 2, 3 corresponding to the respective requirement. The interface processing devices are designed differently and can be selected, for example, from the above-mentioned group of buses or interfaces. In the example illustrated in FIG. 2, a first interface processing unit is therefore illustrated as an SPI interface, a second interface processing unit 2 is illustrated as a UART interface and a third, arbitrary interface processing unit 3 is illustrated. These interface processing units are each individually activatable via a first activation connection $\overline{En1}$, a second activation connection $\overline{En2}$ or a third activation connection $\overline{En3}$.

According to the invention, the interface module has a multiplexer MUX which can be used to switch through the interface connections Rx, Tx, Ck to a respectively selected interface processing unit 1, 2, 3. For this purpose, the multiplexer MUX has a reception input 1*e*, a transmission input 2*e* and a clock input 4*e* which are connected to the reception connection Rx, the transmission connection Tx and the clock signal connection Ck of the interface module.

The multiplexer MUX also has a number of output connection groups 1*aa*, 2*aa*, 4*aa*, 1*ab*, 2*ab* and 1*ac*, 2*ac*, 4*ac* corresponding to the number of interface processing units 1, 2, 3. The output connection groups are connected to the corresponding reception connections MTSR, RxD, X, transmission connections MRST, TxD, Y and possibly clock connections CLK, Z.

The interface module also has an evaluation circuit 4 which is externally connected to a configuration connection $\overline{CS}$ of the interface module and is set up to convert a level of a signal at its input connection and therefore at the configuration connection $\overline{CS}$ into a binary code and to make it available at at least one output connection.

If there are only two interface processing devices in the interface module, one output connection is sufficient since its two possible binary states can be respectively used to select one of these interface processing units by controlling its activation connection.

However, if there are more than two interface processing units 1, 2, 3, a corresponding number of output connections of the evaluation circuit 4 must be provided. In a corresponding manner, the configuration signal must also have a corresponding number of different levels in which the respective interface processing unit to be selected can be coded.

In one advantageous embodiment of the invention, the evaluation circuit 4 has an analog/digital converter 6 for converting the level of the configuration signal, which analog/digital converter provides, at its output, a binary signal which, in one advantageous embodiment of the invention, can be buffered in a memory unit 7 of the evaluation circuit 4. In this case, the memory unit 7 may be a volatile memory, with the result that the configuration has to be carried out again during each new activation of the interface module. However, the memory unit 7 may also be a non-volatile memory, with the result that the selected configuration can be permanently stored. In principle, it is also possible to use only one-time-programmable memories to allow the configuration only once and then in an unalterable manner.

The output connection(s) of the evaluation circuit 4 is/are connected both to corresponding selection connections Sel of the multiplexer MUX and to the selection connection(s) Sel of a selection circuit 5. The selection circuit 5 in turn has a number of output connections 3*aa*, 3*ab*, 3*ac* corresponding to the number of interface processing units 1, 2, 3, each of which output connections is connected to a respective one of the activation connections $\overline{En1}$, $\overline{En1}$, $\overline{En3}$ of the interface processing units 1, 2, 3. One of the interface processing units 1, 2, 3 is therefore activated via the selection connections of the selection circuit 5 and, at the same time, the output connections Rx, Tx, Ck of the interface module are switched through to the connections of the respectively activated interface processing unit 1, 2, 3 via the multiplexer MUX.

In one particularly advantageous embodiment of the invention, the configuration connection corresponds to the module selection connection $\overline{CS}$, with the result that it is possible to save a further connection pin on the interface module. In order to ensure a clear interpretation of the respective function of the signal at this connection as a result of this dual function of the module selection connection $\overline{CS}$, the evaluation circuit 4 is connected to the reset connection $\overline{RST}$ of the interface module and is set up to evaluate the level at the module selection connection $\overline{CS}$ using that edge of the signal at the reset connection which concludes the reset operation and to store it in the memory unit 7 as binary code.

If there are only two interface processing units 1, 2 in the interface module, the evaluation circuit 4, the selection circuit 5 and the multiplexer MUX may be configured in a simpler manner. Since only a selection from two interface processing units 1, 2 needs to be made, the configuration signal at the module selection connection $\overline{CS}$ may already be binary, with the result that it is possible to dispense with explicit conversion into a binary code and the memory unit 7 must also have only one memory cell. In the exemplary embodiment in FIG. 3, the evaluation circuit 4 is implemented in a simple manner by means of a D-type flip-flop, the data input D of which is connected to the module selection connection $\overline{CS}$ and the data output connection Q of which is connected to the selection connection Sel of the multiplexer MUX. The clock input of this D-type flip-flop 4 is connected to the reset connection $\overline{RST}$.

The selection circuit 5 is integrated in the multiplexer MUX, the latter having a third input connection 3e which is connected to the low supply potential connection Gnd, and a further output connection 3aa and 3ab is respectively also provided for the two groups of output connections of the multiplexer MUX. The further output connections are connected to the activation connections $\overline{En1}$ and $\overline{En2}$. In this exemplary embodiment, not only are the reception and transmission connections of the interface processing units 1, 2 connected to the corresponding reception and transmission connections of the interface module by way of the multiplexer MUX, but the desired interface processing unit 1, 2 is also selected according to the level at the output Q of the D-type flip-flop 4 by switching through the low level at the third input 3e of the multiplexer MUX to the respectively selected activation connection $\overline{En1}$ or $\overline{En2}$ of the interface processing units 1, 2.

In order to keep the activation connection $\overline{En1}$ or $\overline{En2}$ which has respectively not been selected at a defined potential, both connections are connected to the high supply voltage potential Vdd via a respective resistor R. Similarly, the configuration connection $\overline{CS}$ is also connected to the high supply voltage potential Vdd via a resistor R.

In accordance with the invention, in the case of such an interface module, not only are the circuit units inside the component reset by means of a reset signal at the reset connection $\overline{RST}$ of the interface module, but rather the level at the module selection connection $\overline{CS}$ is also transferred to the output of the D-type flip-flop using that edge of the signal at the reset connection which concludes the reset operation and is buffered there, as a result of which the interface processing unit 1, 2 desired for further use of the interface module is selected.

Figure 3:
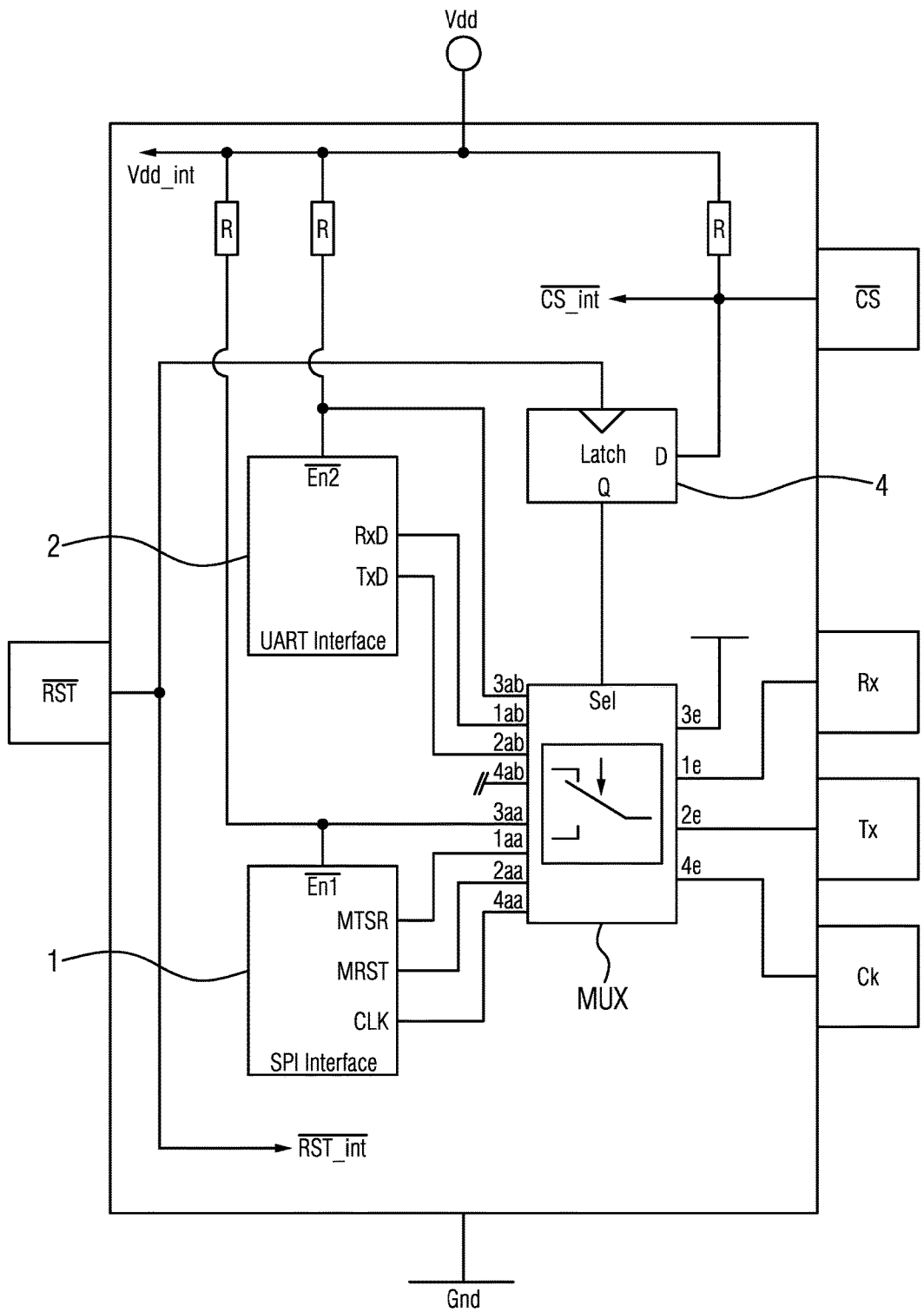
FIG. 3 is a schematic diagram of a first embodiment of an interface module according to the invention having two interface processing units.
Figure 4:
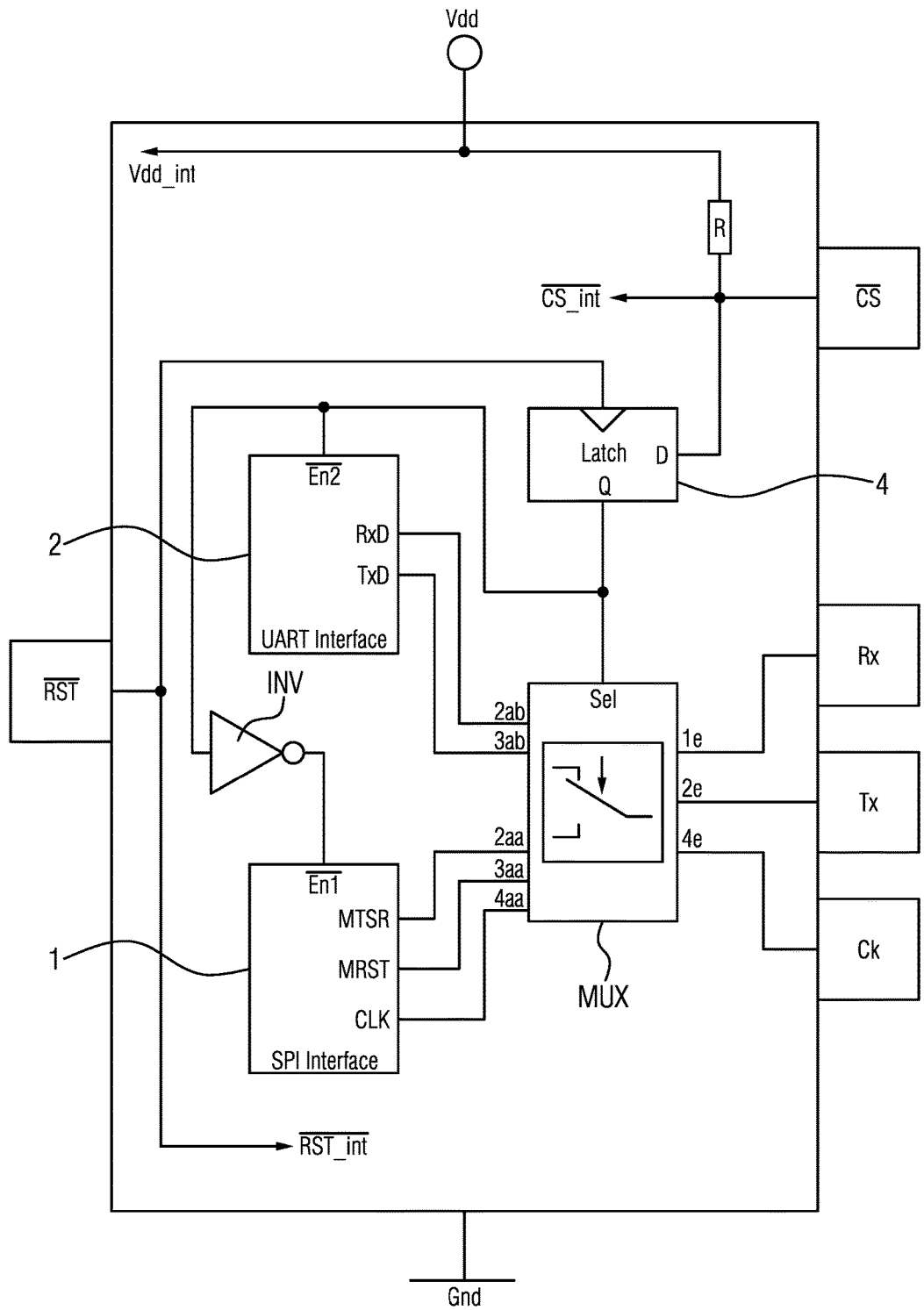
FIG. 4 shows a further embodiment of an interface module according to the invention having only two interface processing units.

The interface module according to FIG. 3 may be simplified even further, as illustrated in FIG. 4, by virtue of the activation connections $\overline{En1}$, $\overline{En2}$ of the interface processing units 1, 2 being connected to the output connection Q of the D-type flip-flop 4 either directly or via an inverter INV. In this manner, the multiplexer MUX may be configured in a simpler manner by being able to dispense with the practice of switching through a low level to outputs 3aa, 3ab to be accordingly provided, as explained in FIG. 3.

In addition to the design of the interface module, the special method for transferring the level at the module selection connection during a reset signal in order to dispense with a separate configuration connection is also an independent invention.

The invention claimed is:

1. An interface module, comprising:
   a plurality of connections, including a configuration connection, a reset connection, a transmission connection, and a reception connection;
   a plurality of interface processing units, including a first interface processing unit and a second interface processing unit different from said first interface processing unit, said interface processing units having a first and a second activation connection, a first and a second transmission connection, and a first and a second reception connection;
   a multiplexer having:
      a transmission input and a reception input connected to said transmission connection and to said reception connection of said plurality of connections;
      a first and a second transmission output and a first and a second reception output, and a control input;
      said first transmission output and said first reception output of said multiplexer being connected to said first transmission connection and to said first reception connection of said first interface processing unit; and
      said second transmission output and said second reception output of said multiplexer being connected to said second transmission connection and to said second reception connection of said second interface processing unit;
   an evaluation circuit having an input connection connected to said configuration connection of said plurality of connections and configured to convert a level of a signal at said input connection into a binary code and to make the signal available at an output connection connected to said control input of said multiplexer;
   a selection circuit having a control connection connected to said output connection of said evaluation circuit and having a first and a second signal output connected to said first activation connection of said first interface processing unit and to said second activation connection of said second interface processing unit.

2. The interface module according to claim 1, wherein said evaluation circuit has a memory unit for storing binary code.

3. The interface module according to claim 2, wherein:
   said configuration connection is a module selection connection;
   said evaluation circuit and said selection circuit are implemented by a D-type flip-flop;
   said data input connection is connected to said module selection connection, said data output connection is connected to said control input of said multiplexer, and a clock input is connected to said reset connection of the interface module;
   said multiplexer further includes a first and a second selection output connection and a third input connection at a predefined potential, said first and second selection output connections being connected to said first activation connection of said first interface processing unit and to said second activation connection of said second interface processing unit.

4. The interface module according to claim 3, wherein said first activation connection of said first interface processing unit and said second activation connection of said second interface processing unit are connected to a high supply potential of the interface module via a resistor, and the predefined potential present at said third input connection of said multiplexer is low supply potential.

5. The interface module according to claim 2, wherein:
said configuration connection is a module selection connection;
said evaluation circuit and said selection circuit are implemented by a D-type flip-flop;
said data input connection is connected to said module selection connection, said data output connection is connected to said control input of said multiplexer, and clock input is connected to said reset connection of the interface module;
said data output connection is connected to said first activation connection of said first interface processing unit via an inverter and is connected to said second activation connection of said second interface processing unit or to said first activation connection of said first interface processing unit and is connected to said second activation connection of said second interface processing unit via an inverter.

6. The interface module according to claim 2, wherein:
said configuration connection is a module selection connection;
said evaluation circuit is connected to said reset connection and includes an A/D converter for converting a level of a signal at said configuration connection into a binary code using an edge of the signal at said reset connection that concludes a reset operation.

7. The interface module according to claim 1, further comprising a clock signal connection, and wherein:
at least one of said interface processing units has a clock signal input;
said multiplexer additionally has a clock signal input and at least one clock signal output connected to a clock signal input of said interface processing unit.

* * * * *